United States Patent [19]
Ninomiya

[11] Patent Number: 5,948,074
[45] Date of Patent: Sep. 7, 1999

[54] EXPANSION UNIT HAVING A SECURITY MECHANISM FOR INHIBITING ATTACHMENT AND DISCONNECTION OF THE EXPANSION UNIT TO AND FROM A PORTABLE COMPUTER

[75] Inventor: Ryoji Ninomiya, Tokyo, Japan

[73] Assignee: Kabushiki Kaisha Toshiba, Kawasaki, Japan

[21] Appl. No.: 08/716,864

[22] Filed: Sep. 20, 1996

[30] Foreign Application Priority Data

Sep. 29, 1995 [JP] Japan .................................. 7-254222

[51] Int. Cl.⁶ ................................ G06F 1/16; H05K 7/10
[52] U.S. Cl. .............................. 710/2; 710/100; 710/101; 361/683; 361/686
[58] Field of Search ..................... 395/821–822, 395/280–283; 361/683–686; 710/1–2, 100–103

[56] References Cited

U.S. PATENT DOCUMENTS

| | | | |
|---|---|---|---|
| 5,507,661 | 4/1996 | Honda et al. ............................ | 439/347 |
| 5,592,362 | 1/1997 | Ohgami et al. .......................... | 361/686 |
| 5,664,118 | 9/1997 | Nishigaki et al. ....................... | 395/283 |
| 5,805,412 | 9/1998 | Yanagisawa et al. .................... | 361/686 |

OTHER PUBLICATIONS

Desk Station IV—User's Manual, pp. 2–34 through 2–38, 1992.

*Primary Examiner*—Zarni Maung
*Assistant Examiner*—Bharat Barot
*Attorney, Agent, or Firm*—Oblon, Spivak, McClelland, Maier & Neustadt, P.C.

[57] ABSTRACT

A novel expansion unit and a computer connectable to the expansion unit are disclosed. A docking station constituting the expansion unit has a locking mechanism. When a portable computer is mounted at a mounting position on the docking station with a key set to a BLOCK position, an eject/lock mechanism is activated, ejecting the portable computer from the docking station. With the key set to the BLOCK position, the depressing of an eject switch is invalidated. In this case, the eject/lock mechanism maintains the portable computer which is locked at the docking station, in a locked state.

18 Claims, 13 Drawing Sheets

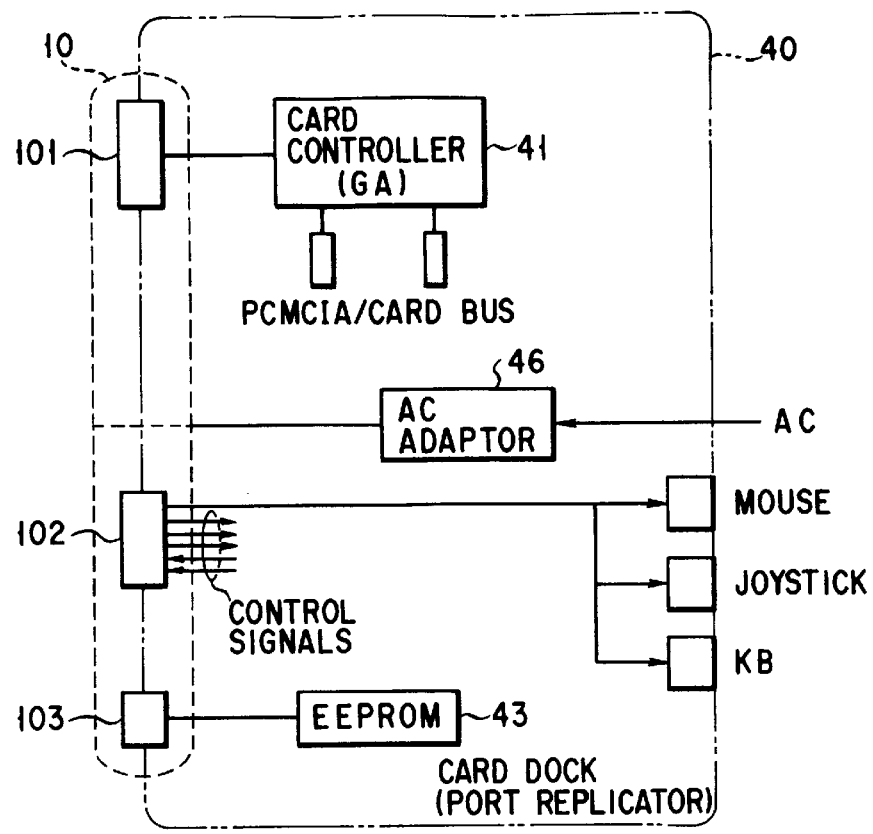
F I G. 3
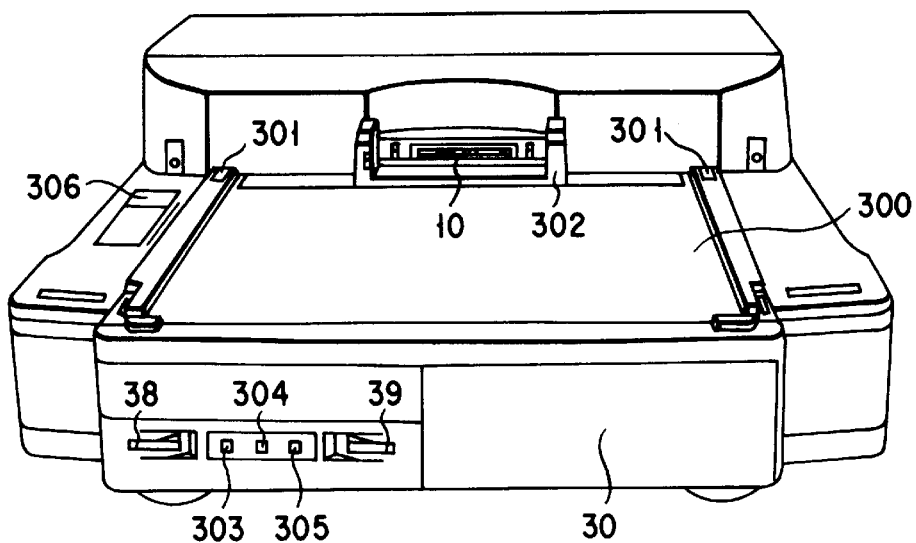
F I G. 4

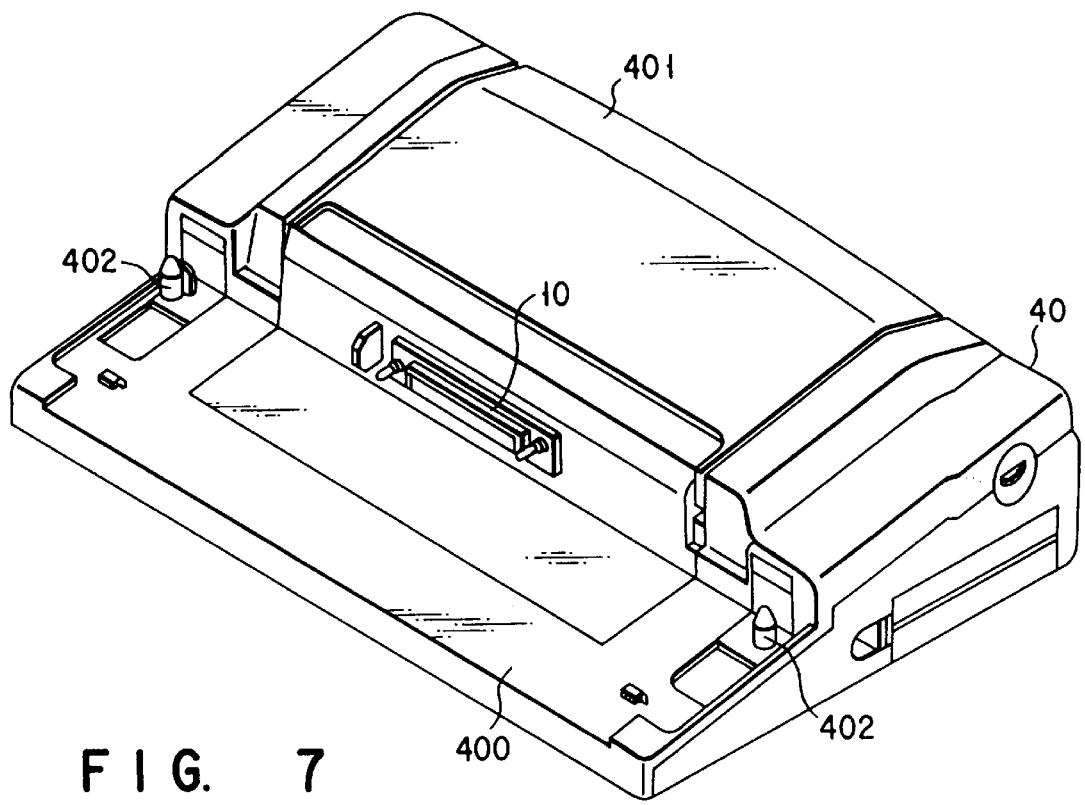
F I G. 7
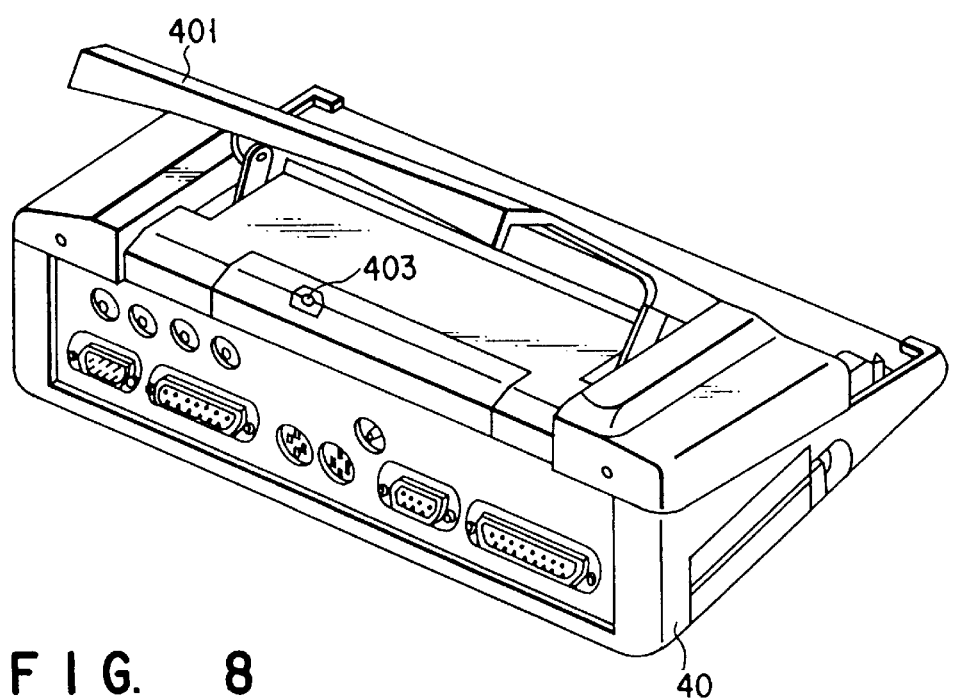
F I G. 8

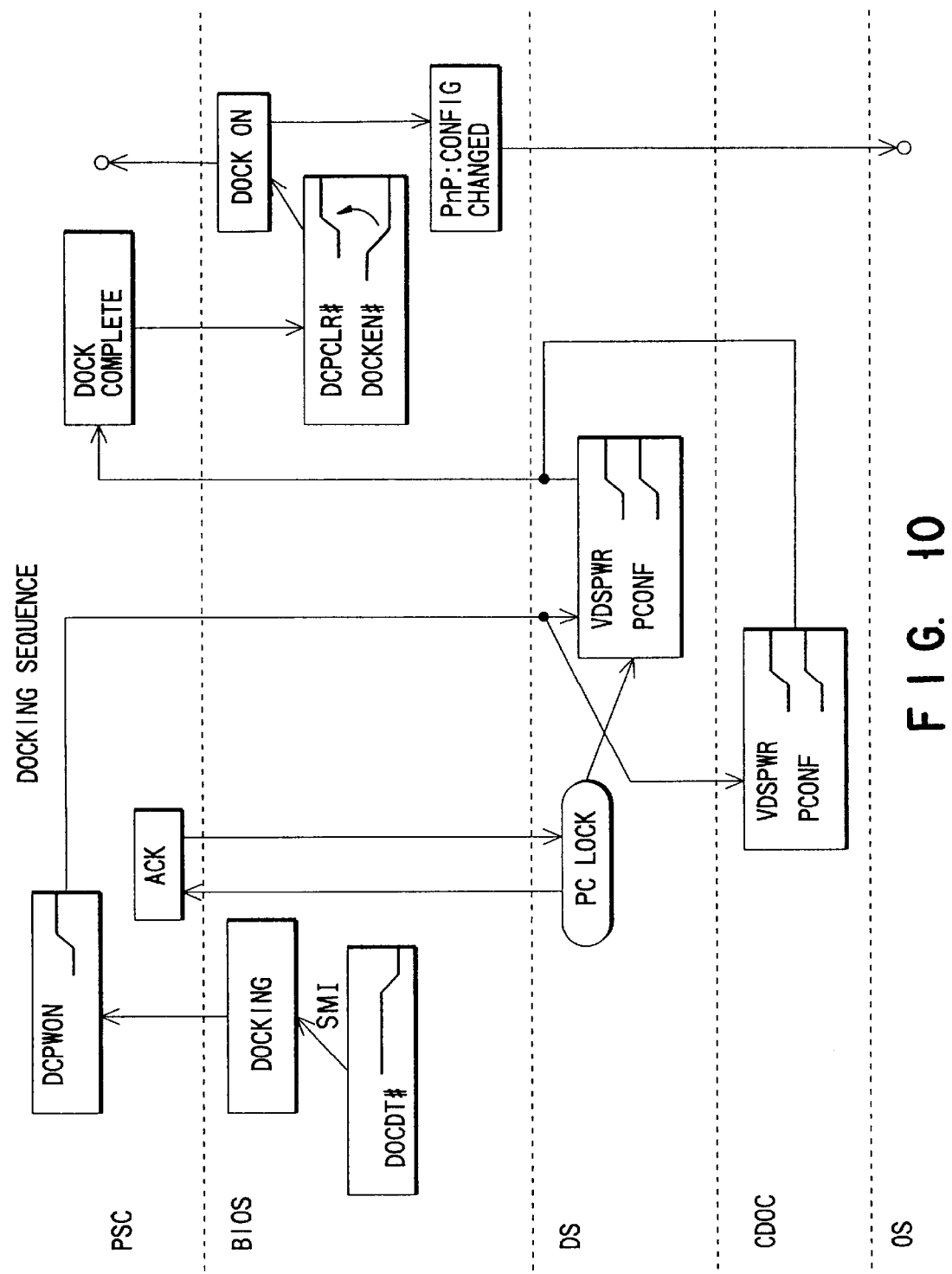
F I G. 10

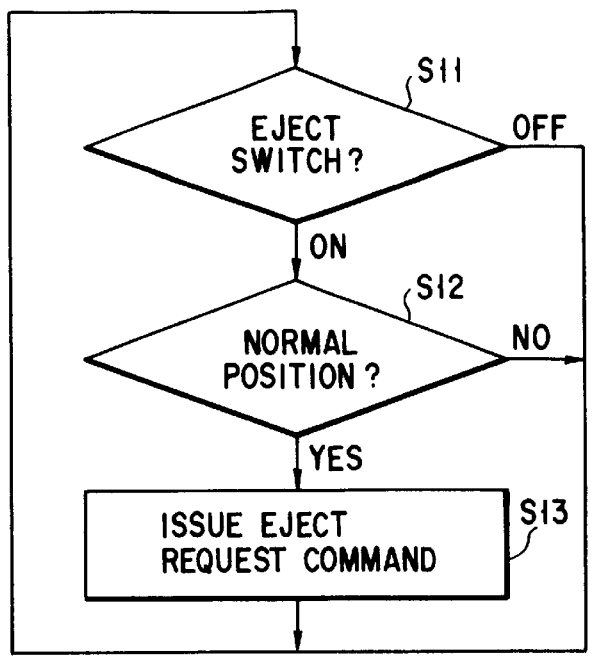
F I G. 11
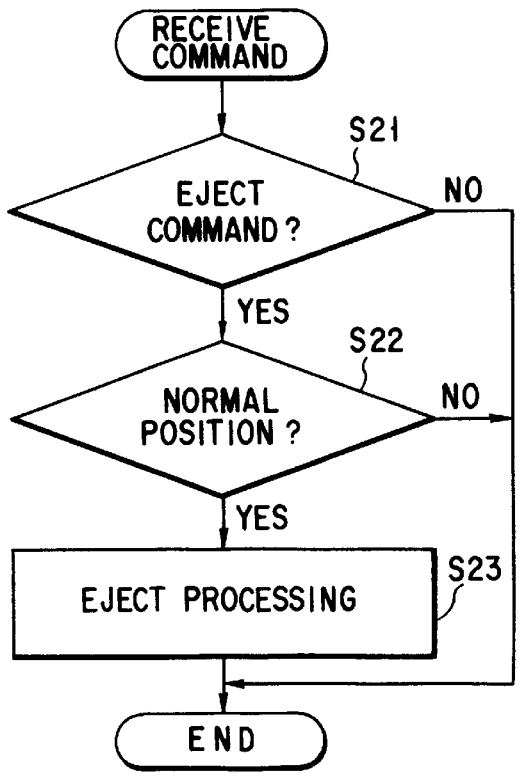
F I G. 12

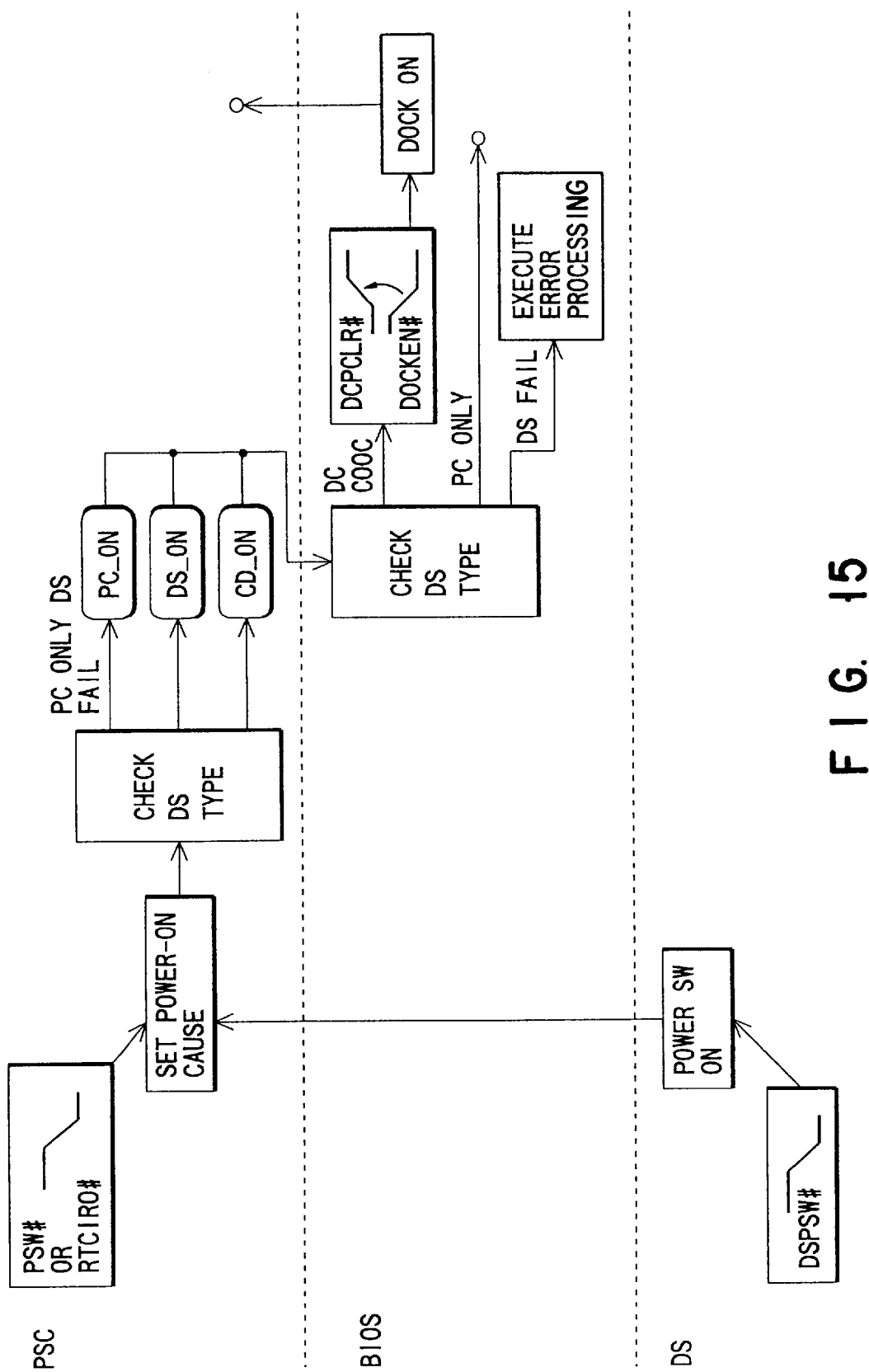
F I G. 15

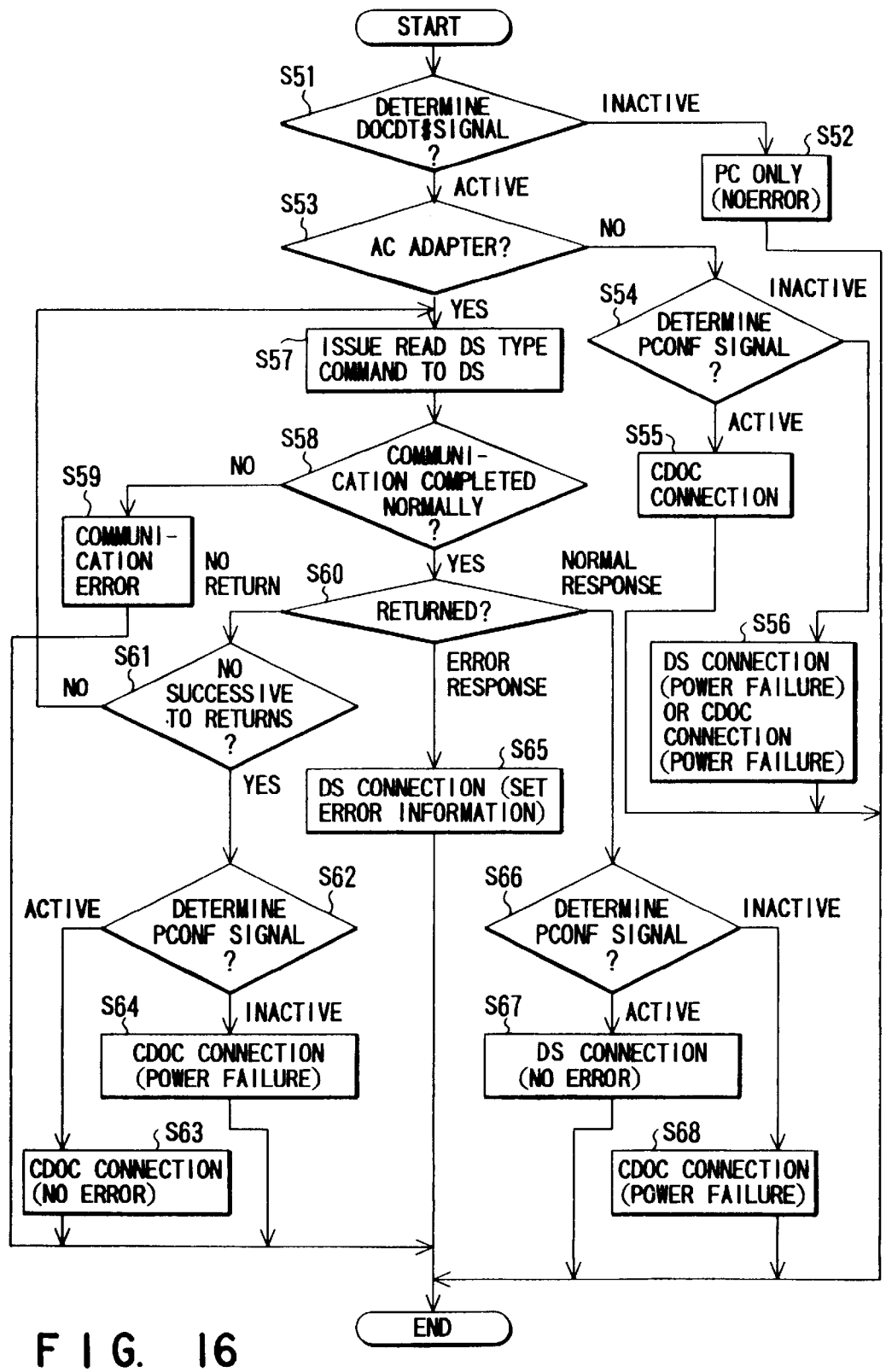
F I G. 16

EXPANSION UNIT HAVING A SECURITY MECHANISM FOR INHIBITING ATTACHMENT AND DISCONNECTION OF THE EXPANSION UNIT TO AND FROM A PORTABLE COMPUTER

BACKGROUND OF THE INVENTION

1. Field of the Invention

The present invention relates to an expansion unit for expanding the functions of a computer system and a computer that can be connected to the expansion unit.

2. Description of the Related Art

Various personal portable computers of lap-top and notebook type easy to carry and operable with a battery have recently been developed. The portable computers of these types are so configured that an expansion unit can be mounted on them as required for expanding the functions thereof.

The expansion units include a drive bay for accommodating a drive unit such as a hard disk drive and an expansion slot for mounting various option cards. The expansion units, when used by being connected with a portable computer as required, facilitate the expansion of the functions of the portable computer without adversely affecting the portability of the portable computer.

The conventional expansion units, however, lack the security for mounting and dismounting a personal computer. In the prior art, for example, a portable computer connected with an expansion unit can be easily removed by anyone. The portable computer (the computer main body) connected with the expansion unit, therefore, is liable to be removed and carried away. Also, a conventional expansion unit can be used by anyone who owns a portable computer connectable to the expansion unit. As a result, the option card in the expansion unit is exposed to the danger of being misused without permission or the data stored in the hard disk is sometimes illegally read out or otherwise damaged by a mischievous conduct of a third party.

In recent years, an operating system or a basic input-output system (BIOS) having the function of automatically restructuring the system environment like the plug-and-play (PnP) has been under development. Utilizing this operating system or the BIOS, the system environment can be automatically changed to the one usable for an option card or the like. The recent trend, therefore, is toward an easier illegal use of an expansion unit by a third party.

The recent years has also seen the development of a simple-type expansion unit such as a port replicator with a PC card controller built therein. The same portable computer, therefore, can be selectively connected to a plurality of expansion units to suit a particular application. If the above-mentioned plug-and-play convenience is to be realized effectively in this application environment, the function is required of recognizing the type of expansion unit connected as well as the connection or disconnection of an expansion unit. This function has not conventionally been realized.

SUMMARY OF THE INVENTION

Accordingly, a first object of the present invention is to provide a computer system having a sufficient security function incorporated in an expansion unit or a computer using the expansion unit for preventing the unauthorized removal of the portable computer from the expansion unit or the unauthorized use of the expansion unit.

A second object of the invention is to provide a computer system having the function of discriminating the type of the expansion unit connected thereto and adapted to effectively utilize the automatic environment setting capability even in an environment where a portable computer is selectively connected to a plurality of types of expansion units.

According to a aspect of the invention, there is provided an expansion unit having a computer main body removably mounted, for expanding functions of the computer main body, comprising: lock means for locking the computer main body at a mounting position on the expansion unit for electrically connecting the computer main body and the expansion unit to each other; eject means for unlocking the lock means and ejecting the computer main body from the mounting position in response to an operation of an eject switch included in the expansion unit; a locking mechanism having a key hole provided in the expansion unit and a key removably inserted in the key hole, the locking mechanism adapted to be set at either a first position to prohibit the computer main body from being separated from the expansion unit or at a second position to allow the computer main body to be separated from the expansion unit; and control means for invalidating the operation of the eject switch, thereby to hold the computer main body at the mounting position on the expansion unit when the locking mechanism is set at the first position.

The expansion unit main body in this aspect has a locking mechanism. Once the user inserts a key into the key hole of the locking mechanism and sets the locking mechanism to the first position, the operation of an eject switch for separating the computer main body from the expansion unit is invalidated. In the case where the locking mechanism is set to the first position, therefore, the computer main body would be locked to the expansion unit main body by locking means even if the eject switch is tampered by a third party. As a result, the computer main body is prevented from being brought away by an unauthorized person, thereby realizing a sufficient security function.

According to a second aspect of the invention, there is provided an expansion unit having a computer main body removably mounted thereon for expanding the functions of the computer main body, comprising: lock means for locking the computer main body at a mounting position on the expansion unit for electrically connecting the computer main body and the expansion unit to each other; eject means for unlocking the lock means and ejecting the computer main body from the mounting position in response to an operation of an eject switch included in the expansion unit; a locking mechanism having a key hole provided in the expansion unit main body and a key removably inserted in the key hole, the locking mechanism adapted to be set at either a first position to prohibit the connection of the computer main body to the expansion unit or a second position to allow the computer main body to be connected to the expansion unit; and control means for separating the computer main body from the expansion unit main body by using the eject means when the computer main body is mounted at the mounting position, with the locking mechanism set at the first position.

The expansion unit main body in this aspect also has a locking mechanism. Once the user sets the locking mechanism to the first position by inserting a key into the key hole of the locking mechanism, the connection of the computer main body to the expansion unit main body is inhibited. In other words, upon detection that a computer main body is mounted newly at the mounting position on the expansion unit main body with the locking mechanism set to the first position, the eject means is activated to separate the computer main body from the expansion unit main body. Consequently, it is possible to prevent the unauthorized use of an option card, if any, in the expansion unit or a mischievous act such as damaging the data or illegally reading data from the hard disk by an unauthorized person, thereby realizing a sufficient security.

Assume that the computer main body is prohibited from separating from the expansion unit on the one hand and the expansion unit is prohibited from connecting to the computer main body at the same time when the locking mechanism is at the first position. Then, it is desirable that as long as the locking mechanism is at the first position, the eject switch is invalidated and a newly-mounted computer main body is ejected, respectively. In this way, the removal of the computer from the expansion unit and the unauthorized use of the expansion unit can both be prevented.

According to a third aspect of the invention, there is provided a portable computer comprising: a computer main body selectively connectable to either a first expansion unit operable only when an AC adapter is connected or a second expansion unit operable even when an AC adapter is not connected; a connector included in the computer main body for connecting the computer main body to either the first expansion unit or the second expansion unit; means for detecting whether the first expansion unit or the second expansion unit is connected to the computer main body, in accordance with the voltage of a predetermined pin of the connector; means for detecting whether an AC adapter is connected to either the first expansion unit or to the second expansion unit, when it is detected that either the first expansion unit or the second expansion unit is connected to the computer main body; first determining means for issuing a command for deciding the type of the connected expansion unit, in response to detection of the connection of an AC adapter, and determining which expansion unit is connected to the computer main body, the first expansion unit or the second expansion unit, in response to the response to the command; and second determining means for detecting whether or not power is normally supplied from a power supply provided in the expansion unit connected to the computer main body, in response to detection of the disconnection of an AC adapter, and for determining which expansion unit is connected to the computer main body, the first expansion unit or the second expansion unit, in accordance with the result of the detection.

With this computer, two types of expansion units can be used. One requires an AC adapter power supply, and the other is configured to be operable without an AC adapter power supply. The first expansion unit requiring an AC adapter power supply is internally supplied with power normally as far as it is connected with the AC adapter, while no normal power supply is available when not connected with an AC adapter. With the second expansion unit which can operate without an AC adapter power supply, on the other hand, power is normally supplied internally regardless of whether an AC adapter is connected or not. An expansion unit is discriminated taking advantage of this feature difference. More specifically, whether an AC adapter is connected or not is first determined. When an AC adapter is connected, both the first and second expansion units operate normally. In the case where the connection of an AC adapter is detected, therefore, a command for discriminating the type of the expansion unit is issued. In response to this command, it is decided which type of the expansion unit, first or second, is connected. In the case where it is decided that an AC adapter is not connected, on the other hand, it follows that only the second expansion unit is normally supplied with power from an internal power supply. It is therefore decided which expansion unit is connected, the first or the second type, by detecting whether power is normally supplied from an internal power supply of the particular expansion unit. In this way, it is possible to discriminate the type of expansion unit connected. The automatic environmental setting capability, therefore, can be effectively utilized even in an environment where the computer main body is selectively connectable to a plurality of types of expansion units.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 3 is a block diagram showing a configuration of a card dock used with the computer system shown in FIG. 1;

FIG. 4 is an external appearance of the docking station shown in FIG. 1;

FIG. 7 is an external appearance of a card dock, as viewed from the front thereof, used with a system according to the embodiment;

FIG. 8 is an external appearance of a card dock, as viewed from the rear side thereof, used with a system according to the embodiment;

FIG. 10 is a diagram for explaining the docking sequence in the case where the computer main body is mounted on the docking station or the card dock in a system according to the embodiment;

FIG. 11 is a flowchart for explaining the operation up to the ejection of a docking station controller (DSC) shown in FIGS. 2 to 9B;

FIG. 12 is a flowchart representing the process executed by the docking station controller (DSC) of FIGS. 2 and 9B at predetermined time intervals;

FIG. 15 is a diagram showing the steps of operation executed for transferring from power off to on state of the system according to the embodiment; and FIG. 16 is a flowchart showing the steps of deciding which expansion unit, a docking station or a card dock, is connected to the computer main body in the system according to the embodiment.

DETAILED DESCRIPTION OF THE PREFERRED EMBODIMENTS

An embodiment of the invention will be described below with reference to the accompanying drawings.

Figure 1:
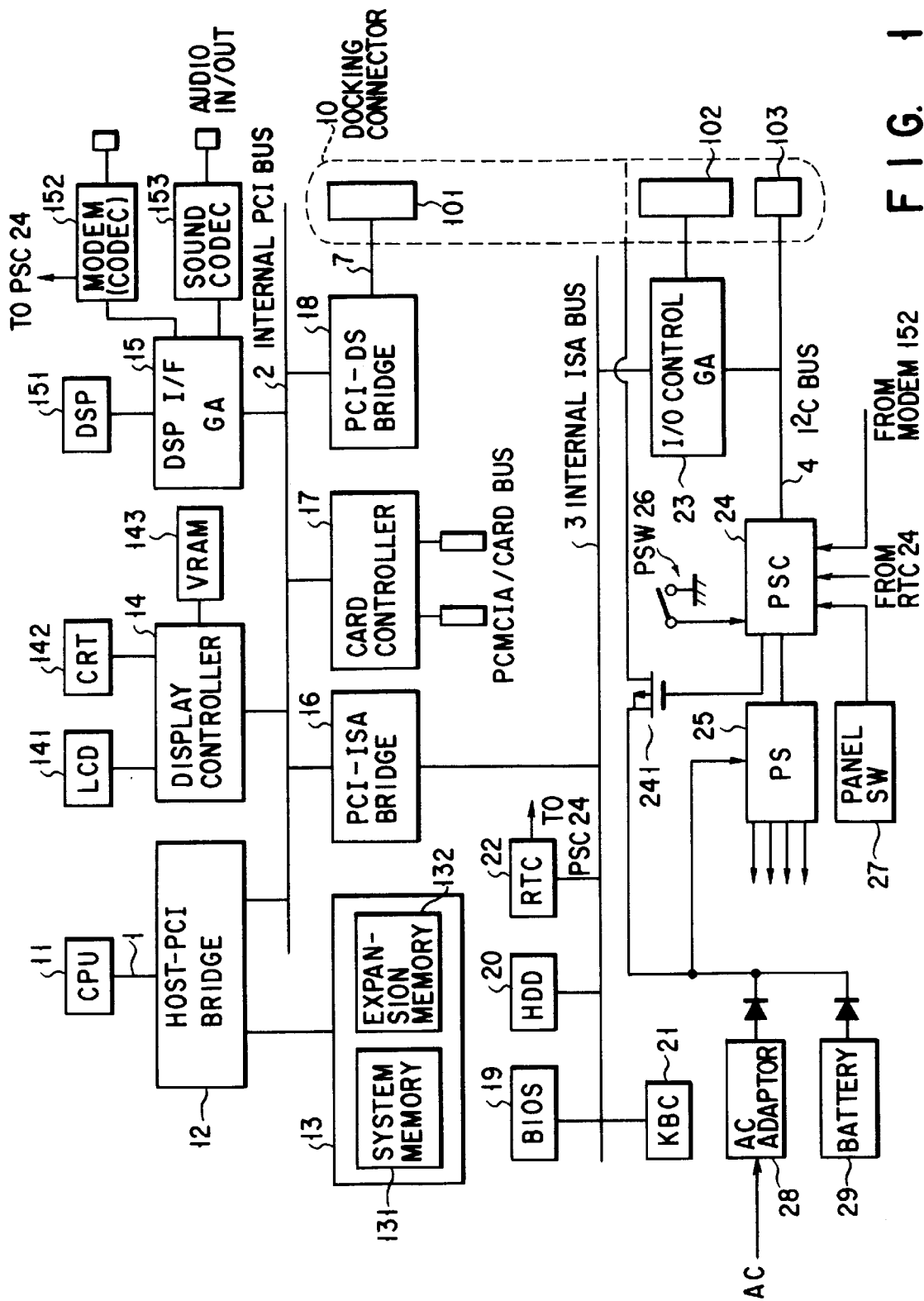
FIG. 1 is a block diagram showing a configuration of a computer system according to an embodiment of the invention.

FIG. 1 shows a configuration of a computer system according to an embodiment of the invention. This computer system is a portable computer of notebook type or lap-top type drivable by a battery. A processor bus 1, an internal Peripheral Component Interconnect (PCI) bus 2, an internal Industry Standard Architecture (ISA) bus 3 and an I²C bus 4 are arranged on the system board. A docking connector 10 included in the portable computer main body is connected with a docking station 30 shown in FIG. 2 or a card dock (port replicator) 40 shown in FIG. 3 as required by the user. The docking connector 10, as shown in FIG. 1, includes three pin groups 101, 102, 103 and a pin for supplying an operating voltage.

The computer main body includes therein a CPU 11, a host/PCI bridge 12, a memory 13, a display controller 14, a DSP interface gate array (DSP IF GA) 15, an internal PCI-ISA bridge 16, a card controller 17, a PCI-DS (DS: docking station) bridge 18, a BIOS ROM 19, an HDD 20, a keyboard controller 21, a real-time clock (RTC) 22, an I/O control gate array 23 and a power controller (PSC) 24.

Figure 2:
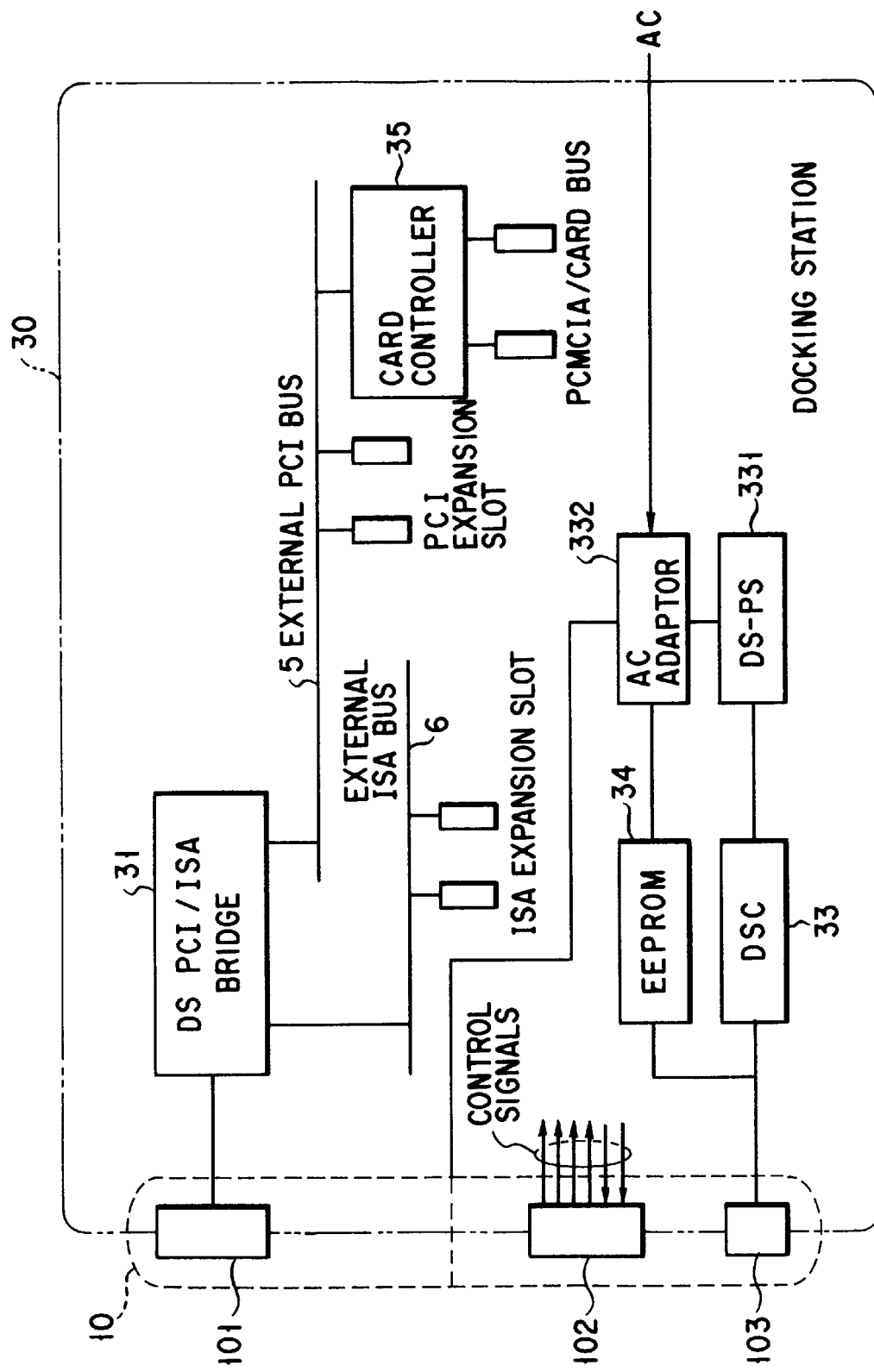
FIG. 2 is a block diagram showing a configuration of a docking station used with the computer system shown in FIG. 1.

The docking station 30 is used for addition of an expansion device such as a PCI expansion card, an ISA expansion card, a PC card, an HDD or a CD-ROM drive. The docking station 30 has arranged therein, as shown in FIG. 2, an external PCI bus 5 and an external ISA bus 6 as an expansion bus, which is connected with a drive bay, a PCI expansion slot and an ISA expansion slot. Also, the docking station 30 includes a DS-PCI/ISA bridge 31, a DS controller 33 and an EEPROM 34.

The card dock 40 is a port replicator having a PC card slot, and as shown in FIG. 3, includes an I/O port connector (a mouse connector, a keyboard connector or the like), a PC card controller 41 and an EEPROM 43.

Now, explanation will be made about the functions and configuration of the components included in the computer main body of FIG. 1.

The CPU 11 is realized, for example, by the microprocessor "Pentium" made and marketed by Intel, U.S.A. The processor bus 1 directly connected to the input/output pins of the CPU 11 has a 64-bit data bus.

The memory 13 is a memory device for storing an operating system, a device driver, an application program to be executed and processing data. The memory 13 is configured of a plurality of DRAM modules. The memory 13 includes a system memory 131 prepackaged on the system board and an expansion memory 132 mounted as required by the user. A high-speed memory such as a synchronous DRAM or a Rambus required to be supplied with a memory clock for each bank is used as a DRAM module constituting the system memory 131 and the expansion memory 132.

The memory 13 is connected to the host-PCI bridge 12 through an exclusive memory bus having a 32-bit or 64-bit data bus. The data bus of the processor bus 1 can also be used as the data bus for the memory bus. In such a case, the memory bus includes an address bus and various memory control signal lines.

The host-PCI bridge 12 is a bridge LSI interconnecting the processor bus 1 and the internal PCI bus 2, and functions as one of the bus masters of the PCI bus 2. This host-PCI bridge 12 has the function of converting the bus cycle including data and an address bidirectionally between the processor bus 1 and the internal PCI bus 2, and the function of controlling the access to the memory 13 through the memory bus.

The internal PCI bus 2 is an input/output bus of synchronous clock type, and all the cycles on the internal PCI bus 2 are performed in synchronism with the PCI bus clock. The maximum frequency of the PCI bus clock is 33 MHz. The PCI bus 2 has an address/data bus used in time division. This address/data bus has a width of 32 bits.

The data transfer cycle on the PCI bus 2 is configured of an address phase and more than one succeeding data phase. The address phase outputs an address and a transfer type. The data phase outputs data of 8 bits, 16 bits, 24 bits or 32 bits.

The display controller 14, like the host-PCI bridge 12, is one of the bus masters of the PCI bus 2 and displays the image data of a video memory (VRAM) 143 on a LCD 141 or an external CRT display 142.

The DSP interface gate array 15 is one of the PCI devices, and constitutes a DSP system for performing telephone/data communication processing and various sound processing in collaboration with a DSP 151, a MODEM (CODEC) 152 and a sound CODEC 153.

This digital signal processor (DSP) interface gate array 15 communicates with the DSP 151, the MODEM (CODEC) 152 and the sound CODEC 153 under the control of an exclusive device driver program executed by being read into the memory 13, and controls the sound and communication processing utilizing the digital signal processing function of the DSP 151.

The internal PCI-ISA bridge 16 is a bridge LSI connecting the internal PCI bus 2 and the internal ISA bus 3, and functions as one of the PCI devices. This internal PCI-ISA bridge 16 has built therein a PCI bus arbiter and a direct memory access (DMA) controller. The internal ISA bus 3 is connected with a basic input/output system (BIOS ROM) 19, a hard disk drive (HDD) 20, a keyboard controller (KBC) 21, a real-time clock (RTC) 22 and an I/O control gate array 23.

The card controller 17 is one of the PCI devices for controlling a PC card according to the specification of the Personal Computer Memory Card International Association (PCMCIA) or the card bus specification.

The PCI-DS bridge 18 controls the connection and disconnection of the bus between the docking station 30 and the card dock 40. In other words, the PCI-DS bridge 18 is a bridge LSI interconnecting the internal PCI bus 2 and the docking bus 7 equivalent to a PCI bus, and functions as one of the PCI devices. This docking bus 7 is led out through the pin group 101 of the docking connector 10 and connected to the docking station 30 and the card dock 40.

The I/O control gate array 23 is a bridge LSI for connecting the internal ISA bus 3 and the I²C bus 4, and has built therein a plurality of registers adapted to be read and written by the CPU 11. The use of these registers makes communication possible between the CPU 11 and a power controller 24 on the I²C bus 4.

A plurality of control signal lines connected with the docking station 30 or the card dock 40 are led out from the I/O control gate array 23 through the pin group 102 of the docking connector 10. Also, the I/O control gate array 23 detects the docking/undocking state of the computer main body with the docking station 30 or the card dock 40. Further, when the computer main body is connected with the docking station 30 or the card dock 40 with the power thereof switched on, the I/O control gate array 23 controls the system not to be erroneously operated or the expansion device not to be damaged in the docking station 30 or the card dock 40, as the case may be, by hot-line connection and disconnection.

The I²C bus 4 is a bidirectional bus configured of one clock signal line and one data line (SDA), and is led out through the pin group 103 of the docking connector 10.

The power controller 24 controls the power supplied to each component part from a power supply 25. Especially, the power controller 24 performs operations in accordance with the on/off of a power switch (PSW) 26, the on/off of a panel switch 27 operated by the opening and closing of the panel, a signal sent from the MODEM 152 and a signal sent from the RTC 22. Also, the power controller 24 controls the power for docking and undocking of the docking station 30 and the card dock 40.

The power supply 25 is connected with an AC adapter 28 connectable to an AC power supply for converting the AC current supplied from the AC power supply into a DC current of a predetermined value and supplying the DC current to the power supply 25. The power supply 25 is also connected with a battery 29 built in the computer main body. Further, the power supply 25 is connected to a predetermined pin of the docking connector 10 in such a manner that a voltage is supplied from the AC power supply connected with the docking station 30 or the card dock 40. The power supply 25 generates an operating voltage (±5 V, ±12 V) required for driving the computer main body on the basis of the voltage supplied through the AD adapter 28, the voltage supplied from the battery 29 or the voltage supplied from the docking station 30 or the card dock 40.

A switch 241 turned on/off in accordance with the control operation of the power controller 24 is interposed between the AC adapter 28 and the battery 29 on the one hand and the pin supplied with a voltage from the docking station 30 or the card dock 40 on the other. The power controller 24 turns on the switch 241 upon detection that power is supplied from an expansion unit such as the docking station 30 or the card dock 40. The voltage from the expansion unit thus is supplied to the power supply 25.

According to this embodiment, in the case where the computer main body 100 is connected to an expansion unit, an AC power supply can be connected to the AC adapter arranged on the expansion unit. It is, however, physically impossible to connect an AC power supply to the AC adapter 28 of the computer main body 100.

Now, the component parts of the docking station 30 of FIG. 2 will be described.

Figure 5:
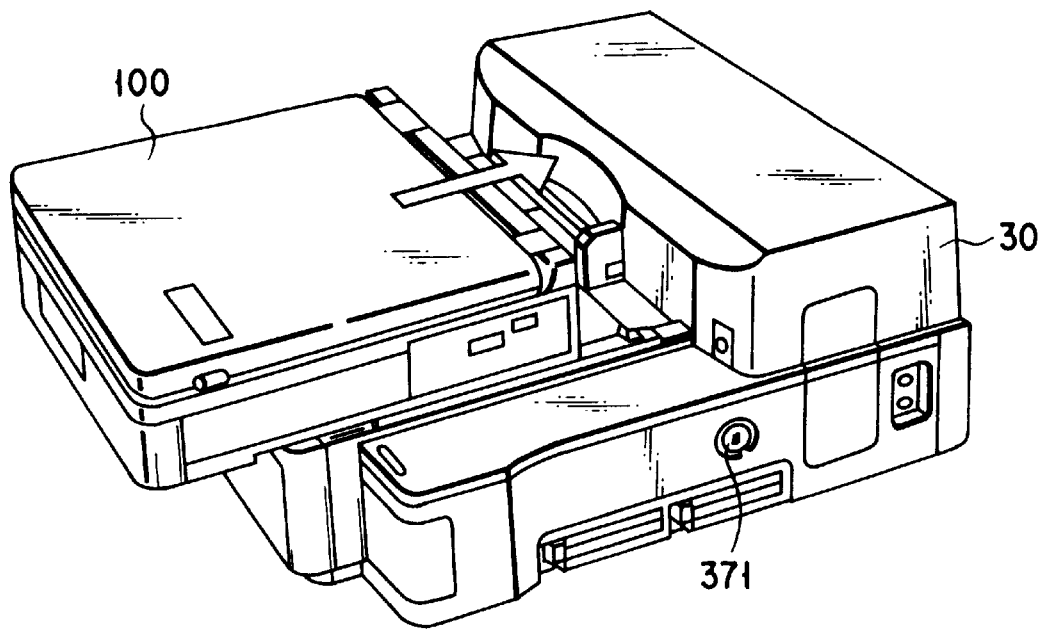
FIG. 5 is a diagram showing the manner in which the computer main body according to the same embodiment is mounted on a docking station.

As described above, the docking station 30 is an expansion unit on which the portable computer main body is mounted removably. FIG. 4 shows an external appearance of the docking station 30 according to an embodiment of the invention. FIG. 5 shows the manner in which the computer main body is mounted on the docking station 30.

As shown in FIG. 4, the housing of the docking station 30 includes a mounting surface 300 for accommodating the portable computer main body. This mounting surface 300 is substantially the same in size as the bottom surface of the portable computer main body. Guides for leading the portable computer main body to the mounting position are provided at the left and right ends of the mounting surface 300. Also, guide pins 301 for fixing the portable computer main body at a position securing connection with the docking station 30 are arranged at the rear end of the guides. The guide pins 301 are protruded from the guides and adapted to be inserted into holes formed in the bottom of the portable computer when the portable computer main body is set at the mounting position and a docking connector 10 thereof is connected with the counterpart of the docking station 30. The guide pins 301 are pressed downward in such a manner as to be removed from the holes formed in the bottom of the portable computer main body when an eject switch 39 is depressed.

The docking connector 10 of the docking station 30 is arranged at the rear end of the mounting surface 300. This docking connector 10 is connected to the docking connector 10 arranged on the rear surface of the portable computer main body when set at the mounting position. Further, the housing of the docking station 30 includes a slidable push-out means 302 adapted to be coupled with the back surface of the portable computer main body for pressing the latter forwardly along the mounting surface 300. As a result, the portable computer main body and the docking connector 10 of the docking station 30 are separated from each other, so that the portable computer main body is ejected from the docking station 30.

The push-out means 302, which is driven by an electric motor, is manually slidable in interlocked relation with the operation of a manual lever 306 by the user when a lock mechanism described later is at a predetermined position.

Also, as shown in FIG. 4, the docking station 30 includes a power switch 38, a power indicator 303, a drive in-use indicator 304, a docking indicator 305 and an eject switch 39. The power indicator 303 is turned on for indicating that the docking station 30 is powered on. The drive in-use indicator 304 is kept on to indicate that the expansion unit HDD, for example, in the docking station 30 is being accessed. The docking indicator 305 starts flickering when the portable computer main body is set at the mounting position, and begins to be kept on from the time when the guide pins 301 are normally inserted into the mating holes formed in the bottom of the portable computer main body and the-portable computer main body is completely fixed. As a result, in the case where the portable computer main body and the docking station 30 fail to be rightly connected to each other for some reason, the docking indicator 305 repeatedly issues an alarm by flickering.

The eject switch 39 is an operating switch for removing the computer main body docked with the docking station 30 from the docking station 30. Upon depression of the eject switch 39, the guide pins 301 come off from the holes formed in the bottom of the portable computer main body, and the portable computer main body is ejected from the docking station 30 by the push-out means 302.

Figure 6:
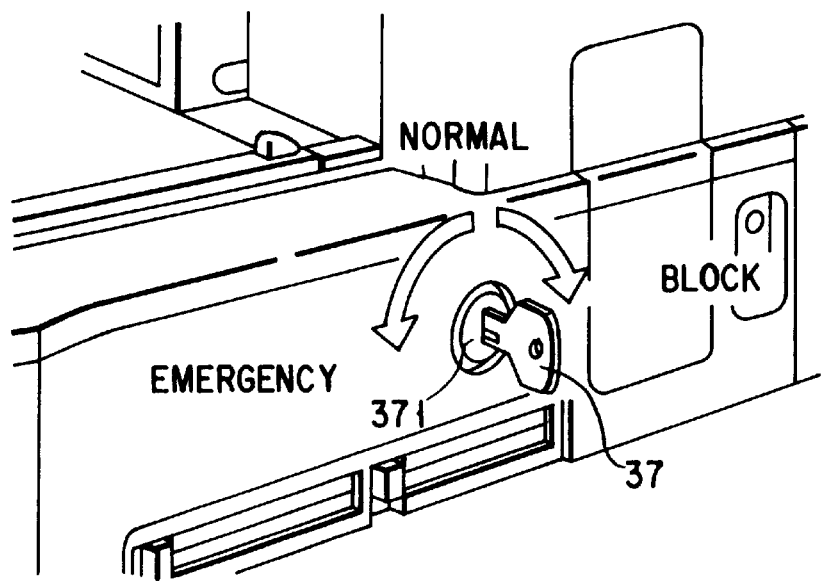
FIG. 6 is a diagram showing a locking mechanism provided in a docking station used with a system according to the embodiment.

As shown in FIG. 6, a locking mechanism is provided on the right side of the docking station 30 for realizing the security function in mounting and dismounting the portable computer with respect to the docking station 30. This locking mechanism includes a key cylinder having a key hole 371, and a key 37 adapted to be inserted removably into the key hole 371 for rotating the key cylinder. The locking mechanism can assume three positions corresponding to the rotational positions of the key cylinder including a normal position (NORMAL), a block position (BLOCK) and an emergency position (EMERGENCY).

The normal position (NORMAL) is where the portable computer main body can be mounted on or dismounted from the docking station 30. In the case where the portable computer is mounted at the mounting position on the docking station 30 with the key 37 at the normal position, the particular portable computer is locked on the docking station 30 by means of the guide pins 301. When the eject switch 39 is depressed, on the other hand, the guide pins 301 are pressed down. The portable computer then is ejected from the docking station 30 by the push-out means 302.

The block position (BLOCK) is where the portable computer is prohibited from being mounted on or dismounted from the docking station 30. In the case where the portable computer is mounted at the mounting position on the docking station 30 with the key 37 at the block position, the push-out means 302 is driven to eject the portable computer from the docking station 30. Also, the depressing operation of the eject switch 39 is invalidated, so that the portable computer, if locked on the docking station 30, is kept in locked state. Further, in the case where the docking station 30 is switched on or the locking mechanism is set to the block position (BLOCK) with the portable computer already locked on the docking station 30, no operation is performed. Also, the portable computer, if not locked, is ejected.

The emergency position (EMERGENCY) is where the power lock/eject mechanism described above is not used but the portable computer can be ejected manually. Only in the case where the key 37 is at the emergency position (EMERGENCY), the portable computer can be manually ejected using the manual lever 306. In other words, unless the locking mechanism is at the emergency position (EMERGENCY), a link mechanism for mechanically coupling the manual lever 306 to the push-out means 302 is in decoupling mode according to the prevailing position thereof relative to the key cylinder. The manual lever 306 and the push-out means 302 thus are mechanically coupled with each other only at the emergency position (EMERGENCY) of the locking mechanism.

As shown in FIG. 2, the DS-PCI/ISA bridge 31 arranged in the docking station 30 having the above-mentioned structure is a bridge LSI for connecting the external PCI bus 5 and the external ISA bus 6 to the docking bus 7 led out to the docking station 30 from the computer main body. The DS-PCI/ISA bridge 31 is one of the PCI devices.

The DS controller 33 is a microcomputer for controlling the power on/off of the docking station 30 and the docking/undocking between the portable computer main body and the docking station 30. The DS controller 33 communicates with the power controller 24 of the computer main body and the I/O control gate array 23 using the I²C bus 4.

The EEPROM 34 has stored therein PnP information required for plug-and-play including the attributes (address, DMA channel, IRQ number, etc.) of the expansion card mounted in the expansion slot of the docking station 30. This PnP information is read from the EEPROM 34 by the control gate array 23 through the I²C bus 4 under the control of the system BIOS of the BIOS ROM 19 when the computer main body is docked with the docking station 30 or the computer main body or the docking station 30 is switched on.

The card controller 35 is for controlling the PC card based on the PCMCIA/card bus like the card controller 17 in the computer main body.

The DS controller 33 is connected with a power supply (DS PS) 331 for supplying an operating voltage to each component of the docking station 30. This power supply 331 generates and outputs various operating voltages (±5 V, ±12 V) on the basis of the voltage supplied from the AC adapter 332 connectable to the AC power supply. The AC adapter 332 converts the AC voltage supplied from an AC power supply into a DC voltage and supplies it to the power supply 331 on the one hand, and supplies the voltage to the computer main body 100 through a predetermined pin of the docking connector 10 on the other hand. The voltage supplied to the computer main body is applied to one terminal of the switch 241 adapted to turn on/off in accordance with the control operation of the power controller 24.

Now, the card dock 41 will be described.

The card dock 40 shown in FIG. 3 is also an expansion unit removably mounted on a portable computer main body.

A card controller 41 arranged in the card dock 40 is for controlling the PC card based on the PCMCIA/card bus.

The EEPROM 43 has stored therein PnP information required for plug-and-play including the attributes of the PC card mounted in the PC card slot of the card dock 40. This PnP information is read from the EEPROM 43 by the control gate array 23 through the I²C bus 4 under the control of the system BIOS of the BIOS ROM 19 when the computer main body is docked with the card dock 40 or the computer main body or the card dock 40 is switched on.

The AC adapter 46 is connectable to an AC power supply external to the card dock 43 for converting an AC voltage into a predetermined DC voltage and supplies this voltage to the computer main body 100 through a predetermined pin of the docking connector 10. The voltage supplied to the computer main body is applied to one terminal of the switch 241 adapted to turn on/off in accordance with the control operation of the power controller 24.

Now, the housing structure of the card dock 40 will be explained with reference to FIGS. 7 and 8.

As shown in FIG. 7, the housing of the card dock 40 has a mounting surface 400 for accommodating the portable computer main body. This mounting surface 400 has a size substantially the same as the bottom of the portable computer main body. Guide pins 402 are arranged at the right and left rear ends of the mounting surface 400. These guide pins 402 are adapted to be inserted into the holes formed in the bottom of the portable computer main body and guide the portable computer main body to a mounting position in such a manner that the connector 10 of the portable computer main body and the connector 10 of the card dock 40 are connected to each other. The guide pins 402 are adapted to move between front and rear positions on the mounting surface 400 in interlocked relation with the operation of a manual handle 401. When the manual handle 401 is lifted by the user, the guide pins 402 are located at the front of the mounting surface 400. When the manual handle 401 is pushed down as shown, on the other hand, the guide pins 402 are located at the rear position of the mounting surface 400. When mounting the portable computer main body on the card dock 40, first, the manual handle 401 is lifted. Under this condition, the holes formed in the bottom of the portable computer main body are fitted over the guide pins 402. The manual handle 401 is pushed down, so that the guide pins 402 guide the portable computer main body to the mounting position of the card dock 40, with the result that the connectors 10 are coupled to each other. When removing the portable computer main body from the card dock 40, the manual handle 401 is lifted, whereby the portable computer main body is pushed out forward by the guide pints 402, thereby disconnecting the connectors 10 from each other.

FIG. 8 shows an external appearance of the card dock 40 as viewed from the rear side thereof. This figure shows the manual handle 401 in a lifted-up state. A detection switch 403 arranged on the housing of the card dock 40 is used for detecting the lifting up of the manual handle 401 or the like operation.

Figure 9A:
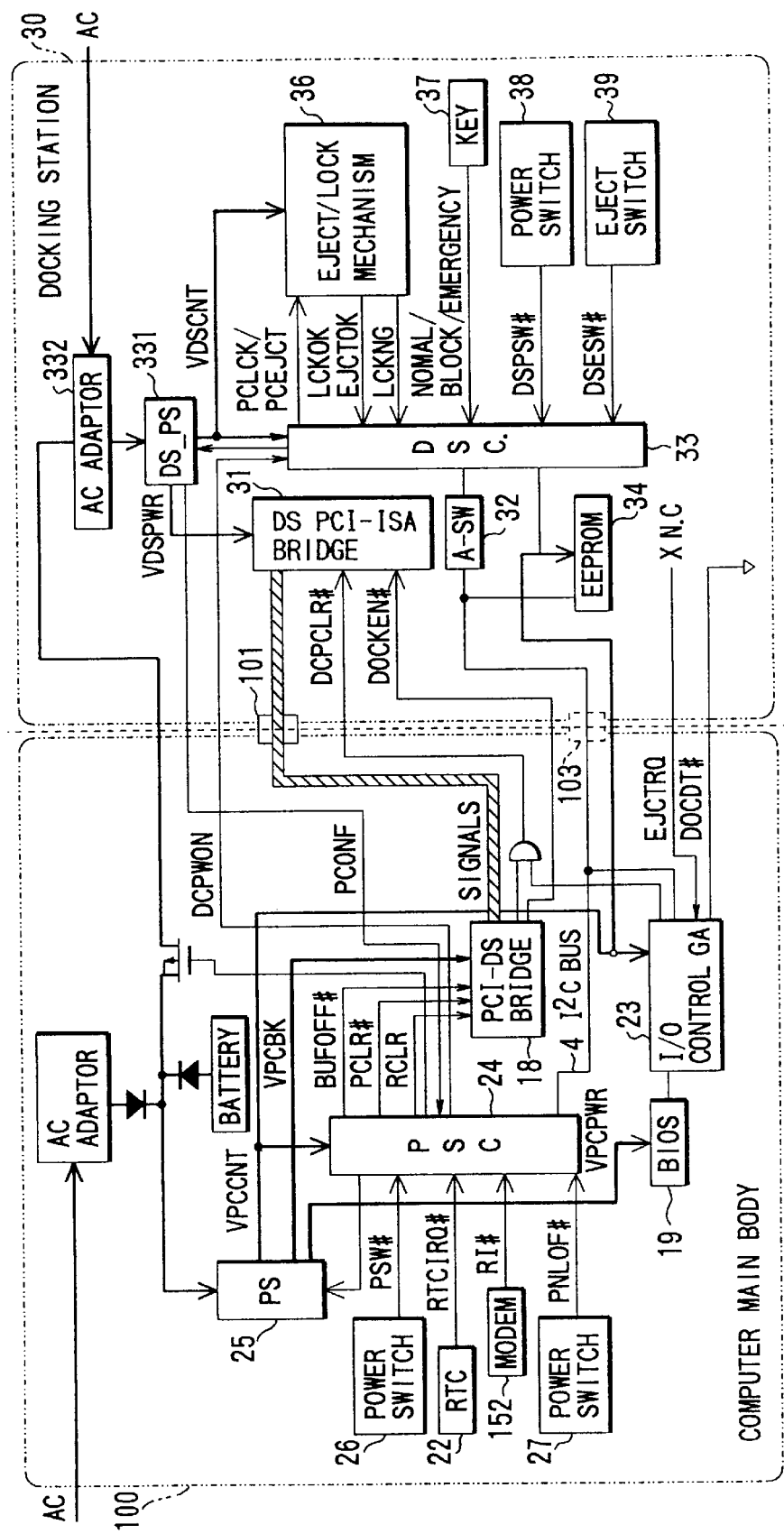
FIGS. 9A and 9B are diagrams showing a configuration for dock/undock control between the computer main body and the docking station and between the computer main body and the card dock, used with a system according to the embodiment.
Figure 9B:
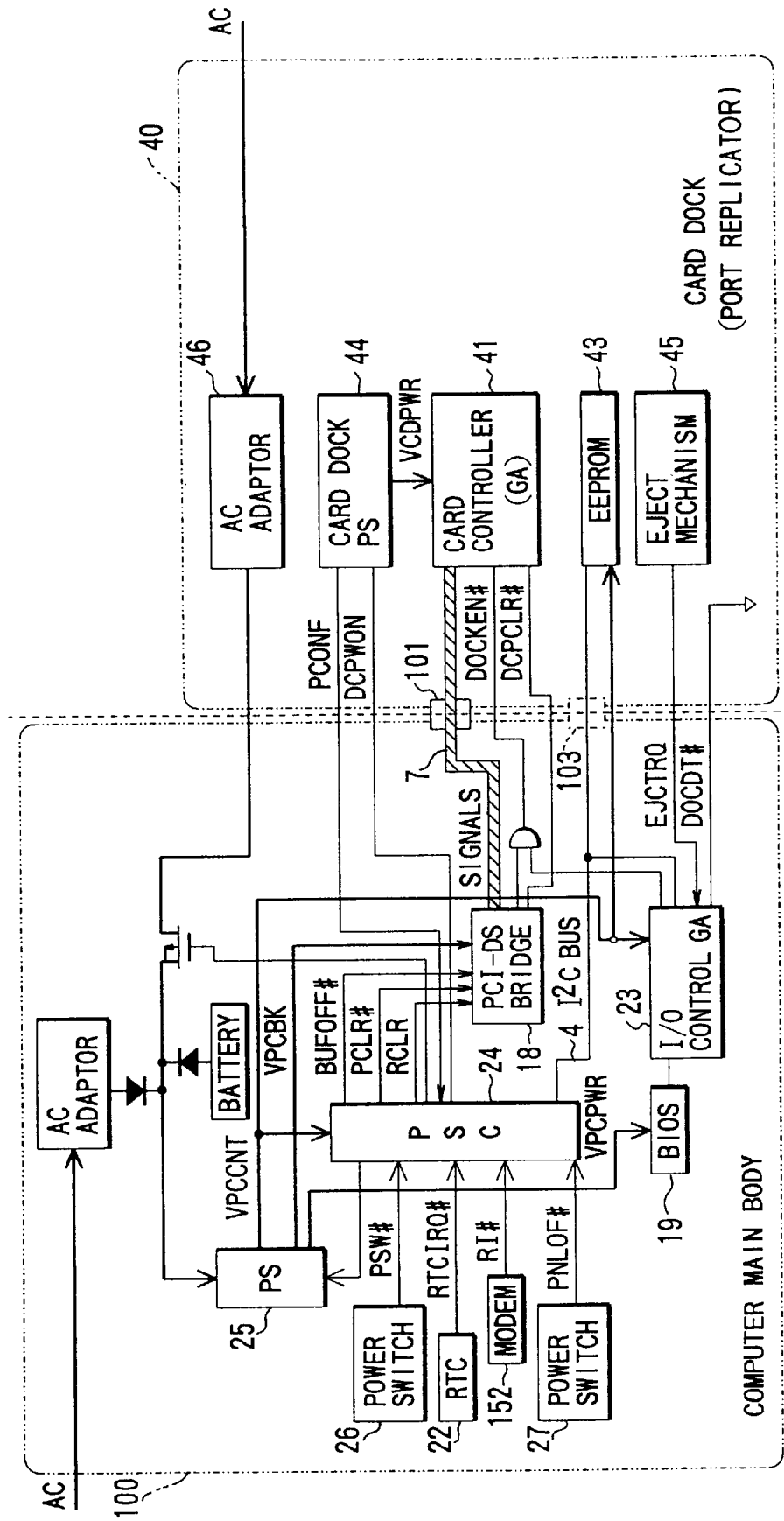

FIGS. 9A and 9B show component units for docking/undocking the computer main body 100 with the docking station 30 or the card dock 40, as the case may be, of all the system components described with reference to FIGS. 1 to 3, and a voltage supply path from each AC adapter of external power supplies which may be connected. The solid lines in the diagram represent power lines. Signals used for docking/undocking operation will be explained below.

<System Power Supply>

VPCCNT: VPCCNT is a power supply for the control system which is normally output from the power supply circuit (PS) 25 of the computer main body 100. The VPCCNT is supplied to the I/O control gate array 23 and the power supply controller 24 for communication with the docking station 30 or the card dock 40 in order to control the mounting and dismounting of the computer main body 100.

VPCBK: VPCBK is a back-up power supply output from the power supply circuit (PS) 25 and is supplied to the PCI-DS bridge 18 when power is switched on or suspended. The VPCBK is also supplied to the memory 13, etc. of FIG. 1 in order to prevent the information required for power resumption from being erased.

VPCPWR: VPCPWR is a driving power supply output from the power supply (PS) circuit 25 only when power is switched on. The BIOS ROM 19 is supplied with the VPCPWR.

<Power Supply Controller (PSC)>

PSW#: PSW# (input) is a power supply switch signal from the power supply switch 26 and becomes low when the power switch 26 is depressed.

PTCIRQ#: PTCIRQ# (input) is an interrupt signal from the RTC 22 and becomes low when active.

RI#: RI# (input) is a ring signal from the modem 152 and becomes low when active.

PNLOF#: PNLOF# (input) is a panel switch signal from the panel switch 27 and becomes low when the display panel of the computer main body is opened.

BUFOFF#: BUFOFF# (output) is a signal for turning off the gate of the gate array connected to a bus driven by the driving power supply, and is used for indicating to the PCI-DS bridge 18 that power is suspended, for example. The BUFOFF# becomes low when active.

PCLR#: PCLR# (output) is a reset signal output when power is switched on or off, and becomes low when active.

RCLR: RCLR (output) is a reset signal output when power is resumed or turned on, and becomes high when active.

DCPWON: DCPWON (output) is a signal for instructing the power supply circuit 4 in the card dock 40 or the docking station 30 to switch on power, and becomes high when active.

<I/O Control Gate Array>

DOCDT#: DOCDT# (input) is a voltage value of a predetermined pin of the connector 10, and becomes low when the computer main body is connected to the docking station 30 or the card dock 40.

<BIOS>

The system BIOS stored in the BIOS ROM 19 is for exchanging data with the control of the power supply controller 24 and the docking station 30 through the I/O control gate array 23.

DCPCLR#: DCPCLR# (output) is a reset signal for the gate array in the docking station 30 or the card dock 40, and becomes low when active.

DOCKEN#: DOCKEN# (output) is a connection permit signal for the bus connecting the docking station 30 or the card dock 40, and is used for notifying the DS-PCI/ISA bridge 31 in the docking station 30 or the card controller 41 of the card dock 40 that the bus is connected. The DOCKEN# becomes low when active.

<Docking Station>

DSPSW#: DSPSW# (input) is a signal indicating that the power supply switch 38 in the docking station 30 is depressed, and becomes low when active.

DSESW#: DSESW# (input) is a signal indicating that the eject switch 39 in the docking station 30 is depressed, and becomes low when active.

PCLCK: PCLCK (output) is a signal for activating the mechanism for locking the computer main body, and is sent to the eject/lock mechanism 36 for locking/ejecting the computer main body by motor drive.

PCEJCT: PCEJCT (output) is a signal for activating the mechanism for ejecting the computer main body, and is sent to the eject/lock mechanism 36.

LCKOK: LCKOK (input) is a signal indicating that the computer main body is completely locked.

LCKNG: LCKNG (input) is a signal indicating that the locking operation of the computer main body is stalled midway.

EJCTOK: EJCTOK (input) is a signal indicating that the computer main body is completely ejected.

NORMAL/BLOCK/EMERGWNCY/: NORMAL/BLOCK/EMERGENCY (input) are signals indicating the positions of the key 37. NORMAL indicates that the key 37 is located at a position for normal operation. BLOCK indicates that the key 37 is located at a position where the computer main body is not ejected mechanically when docked and the computer main body is not docked when undocked. Further, EMERGENCY indicates that the key 37 is located at a position where the computer main body can be ejected manually.

VDSCNT: VDSCNT is a control power supplied from the power supply circuit (DS PS) 331 whenever in the presence of an AC input.

VDSPWR: VDSPWR is a drive power supply and is supplied to the PCI slot and the bay from the power supply circuit (DS PS) 331 when power is switched on.

PCONF: PCONF (output) is a signal which becomes active when the VDSPWR is normal, and becomes high when active. The power supply circuit (DS PS) 331 of the docking station 30 operates normally only when the AC adapter is connected.

The docking station controller 33, which has a different power supply from the devices connected with the I$^2$C bus in the computer main body, is connected to the I$^2$C bus through an analog switch 32.

<CDOC>

EJCTRQ: EJCTRQ (output) is a signal indicating that the handle 401 is moved to a predetermined position and the computer main body is about to be ejected. This signal becomes high when active. The EJCTRQ is output from the detection switch 403 of FIG. 8.

PCONF: PCONF (output) is a signal indicating that the power supplied to the PC card is switched on.

VCDPWR: VCDPWR is a drive power output from the power supply circuit 44, and is supplied to the PC card slot.

The power supply circuit 44 of the card dock 40 can be operated by the power supplied from the computer main body even when the AC adapter is not connected.

Now, explanation will be made with reference to FIG. 10 about the docking sequence in mounting the computer main body on the docking station 30 or the card dock 40.

When the docking connectors 10 for the computer main body and the docking station 30 or the card dock 40 are connected to each other, the DOCCDT# becomes active. As a result, the I/O control gate array 23 detects the connection with the docking station 30 or the card dock 40 and notifies the connection to the CPU 11 by the SMI (system management interrupt). If power is off under this condition, power is switched on by the power supply controller 24 before the connection detection is notified to the CPU 11. The CPU 11 starts executing the BIOS. The BIOS issues to the power supply controller (PSC) 24 a command (Docking) indicating that the docking connectors 10 of the computer main body and the docking station 30 or the card dock 40 are physically connected to each other. The power supply controller (PSC) 24 activates the DCPWON and instructs the docking station 30 or the card dock 40 to switch power on.

In the case where the computer main body is connected to the docking station 30, the VDSPWR starts to be supplied in response to the DCPWON. When power is supplied normally, the PCONF becomes active. With the docking station 30, on the other hand, the VPCCNT is supplied from the computer main body when the computer main body is connected. At this point in time, the locking control process (PC-LOCK) by the DSC 33 is started. In the case where the key 31 is at normal (NORMAL) position, the computer main body is locked with the docking station 30 by means of the lock/eject mechanism 36.

In the case where the computer main body is connected to the card dock 40, by contrast, the VCDPWR begins to be supplied in response to the DCPWON. When power is supplied normally, the PCONF becomes active. The computer main body is already locked with the card dock 40 by this time.

After that, the power supply controller (PSC) 24, upon confirmation that the internal power supply of the docking station 30 or the card dock 40 has been normally turned on by the PCONF, notifies the BIOS by a command (Dock Complete) that the docking station 30 or the card dock 40 and the computer main body have reached the same power level.

The BIOS causes the PCI-DS bridge 18 to turn on the gate with the docking bus 7 thereby to connect the PCI bus 2 and the docking bus 7. At the same time, the BIOS activates the DOCKEN# and DCPCLR#, thereby connecting the DS-PCI/ISA bridge 31 and the docking bus 7 or the card controller 41 and the docking bus 7.

After that, the BIOS notifies the power supply controller (PSC) 24 by a command (Dock ON) that the computer main body is connected to the docking station 30 or the card dock 40 by DOCKEN#. At the same time, the BIOS sets an environment in collaboration with the OS to operate the docking station 30 or the card dock 40 appropriately.

The process up to the ejection of the computer main body by the docking station controller (DSC) will be explained with reference to FIGS. 11 and 12. FIG. 11 shows the process executed by the DSC 33 at predetermined timing intervals.

The DSC 33 first detects whether the eject switch 39 is depressed at predetermined timing intervals (several msec) (step S1). In the case where the eject switch is depressed (YES at step S1), the DSC 33 decides whether the key 31 is located at NORMAL position (step S2).

In the case where the key 31 is located at NORMAL position (YES at step S2), the DSC 33 decides that the operator has performed the operation of ejecting the computer main body 100, and issues an eject request command to the computer main body 100 through the I²C bus 4 (step S3).

In the case where the eject switch 39 is not depressed (NO at step S1) or in the case where the eject switch 39 is depressed but the key 31 is not located at NORMAL position (NO at step S2), the DSC 33 decides that the process for ejecting the computer main body 100 has not been performed and performs no process relating to the ejection of the computer main body 100.

FIG. 12 shows the processes after the eject request command is issued to the computer main body 100 by the DSC 33. The DSC 33, upon receipt of a command through the I²C bus 4, decides whether the command thus received is an eject command (step S21). In the case where the command received is an eject command in response to the eject request command (YES at step S21), the DSC 33 decides whether the key 31 is located at a NORMAL position or not (step S22).

In the case where the key 31 is located at a NORMAL position (YES at step S22), the DSC 33 decides that the process for ejection is complete in the computer main body 100 and that the conditions for ejection are satisfied for the docking station 30. The DSC 33 thus starts the ejection process (step S23).

In the case where the command received is not an eject command (NO at step S21) or in the case where the key 31 is not located at NORMAL position (NO at step S22), the DSC 33 performs no eject process. Instead, the DSC 22 cancels the mode of receiving the eject command and starts the normal process.

Now, the locking control process executed by the DSC 33 will be explained in detail with reference to FIG. 13.

The DSC 33, upon detection that the VPCCNT is turned on (step S31), determines whether the present position of the key 31 is BLOCK or not (step S32). If the key 31 is not located at BLOCK position, the DSC 33 decides whether the locking process is complete or not (step S33). In the case where the locking process is complete, there is no need to perform the locking process any further, and therefore the locking process is terminated (YES at step S33). In the case where the locking process is not complete, on the other hand, the DSC 33, after waiting for a predetermined time, requests the power supply controller 24 to provide whether the lock request command can be issued for executing the locking. The DSC 33 retries to issue the lock request command not more than twice. In the case where an ACK is returned from the power supply controller 24 by that time, the eject/lock mechanism 36 has been caused to start the locking operation (steps S34 to S39). When the computer main body is locked in normal fashion by the guide pins 301, the locking control process is terminated. If an error occurs with the guide pins 301 being stalled midway, however, the DSC 33 causes the eject/lock mechanism 36 to eject the computer main body (steps S40 to S43).

In the case where step S32 detects that the key 31 is located at BLOCK position, on the other hand, the DSC 33 first determines whether the portable computer is already locked with the docking station 30 (step S44), and if the portable computer is locked, executes the eject operation of step S43. In the case where the key 37 is located at BLOCK position, therefore, a push-out means 302 is driven thereby to forcibly eject the portable computer from the docking station 30 when the portable computer is mounted on the docking station 30.

Figure 13:
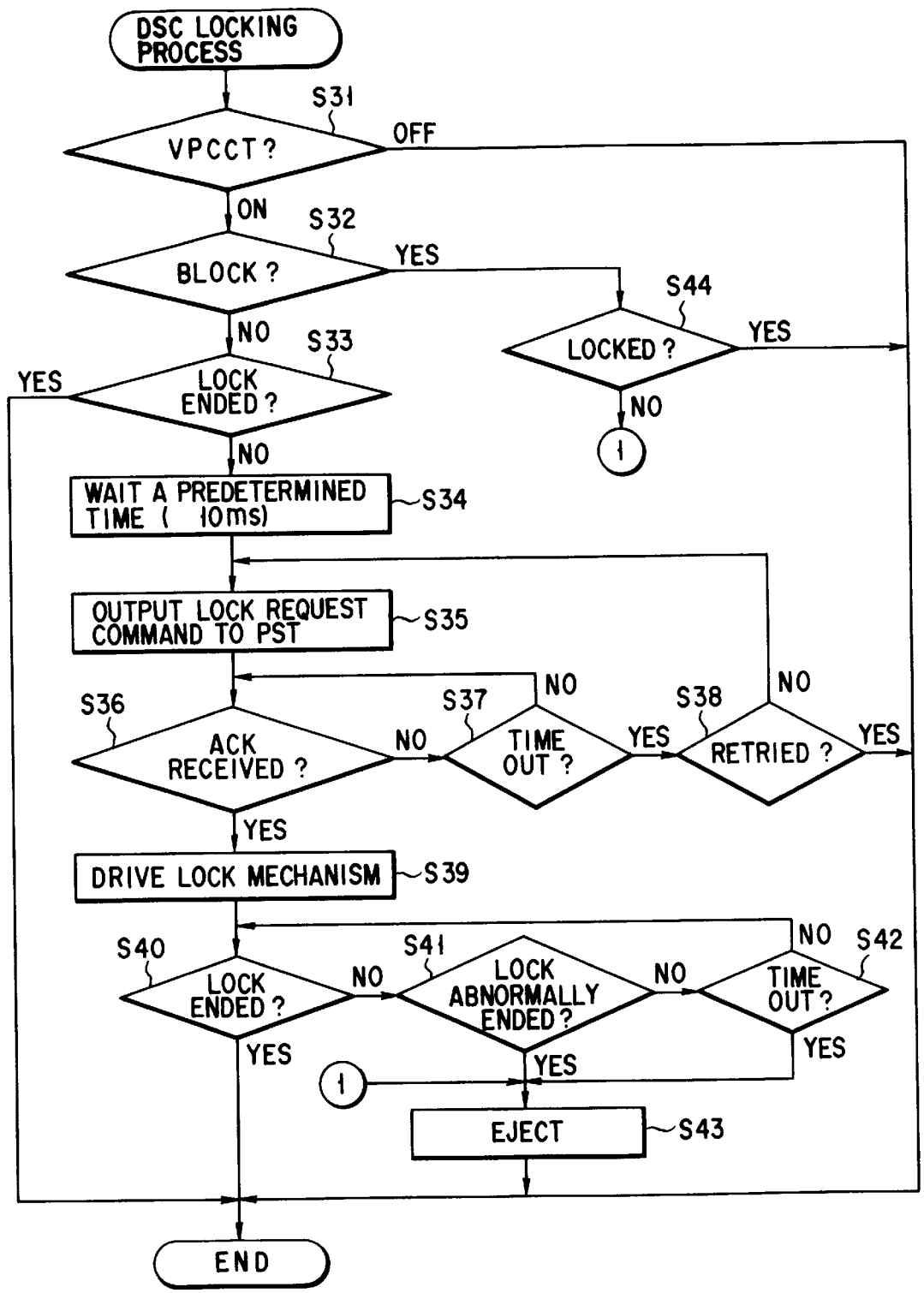
FIG. 13 is a flowchart showing the steps of the locking control process executed within the docking sequence of FIG. 10.

The locking control process of FIG. 13 is executed at regular time intervals. In the case where the docking station 30 is switched on with the portable computer already locked on the docking station 30 or in the case where the locking mechanism is set to the lock position (BLOCK), no operation is performed. Unless the portable computer is locked, on the other hand, the portable computer is ejected.

Figure 14:
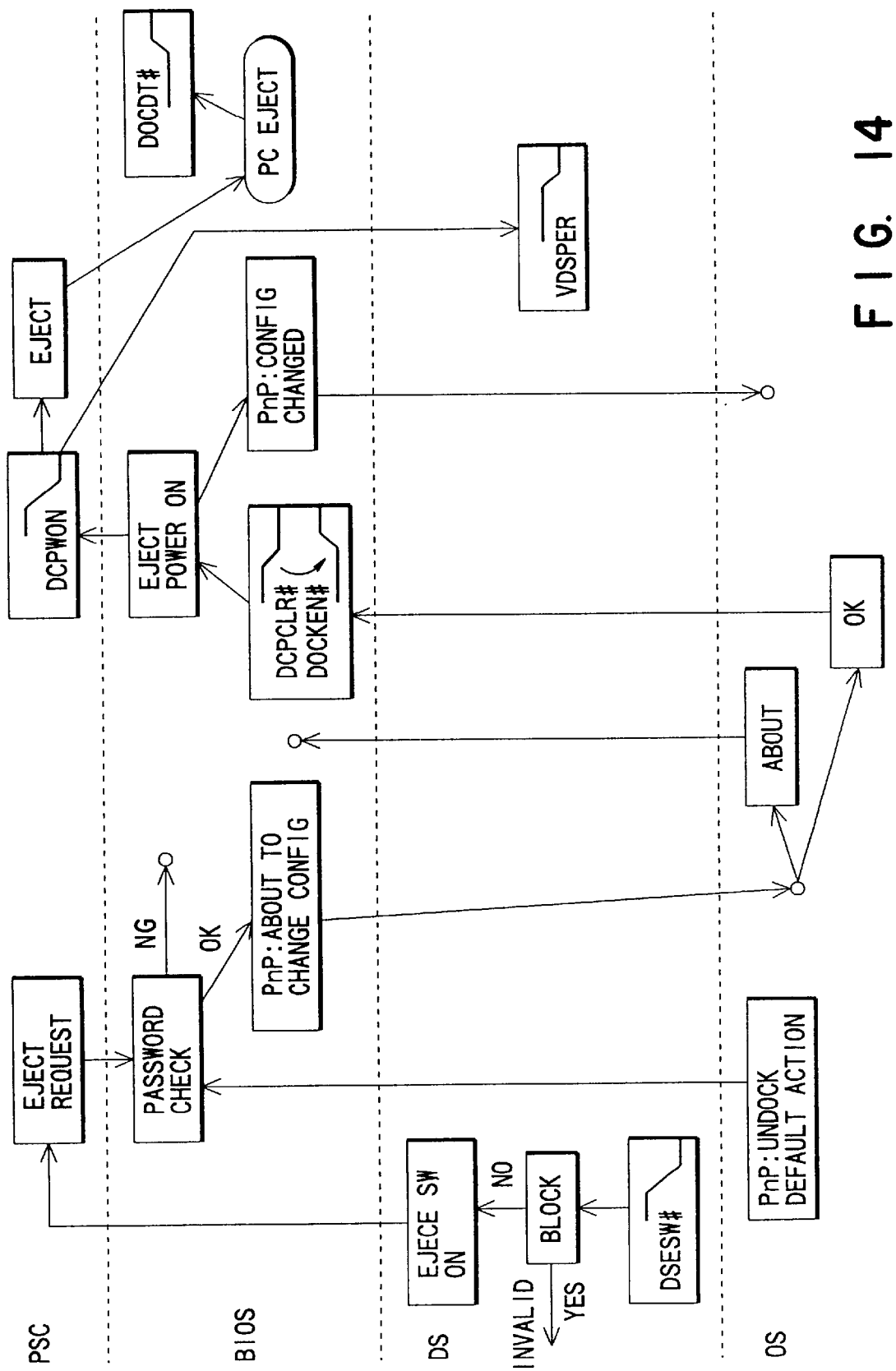
FIG. 14 is a diagram for explaining the undocking sequence in the case where the computer main body is dismounted from the docking station or the card dock in a system according to the embodiment.

Now, explanation will be made about the undocking sequence for the case in which the computer main body is dismounted from the docking station 30 with reference to FIG. 14.

When the eject switch 39 is depressed, the DSESW# becomes active, whereby the DSC 33 detects that the eject switch 39 is depressed. The DSC 33 determines whether the present position of the key 31 is at BLOCK. If the key 31 is at BLOCK position, the DSC 33 fails to respond to the depression of the eject switch 39.

In the case where the present position of the key 31 is not at BLOCK, on the other hand, the power supply controller 24 is notified by a command (Eject SW ON) that the eject switch 39 was depressed. The power supply controller 24 notifies the BIOS by a command (Eject Request) that an eject request is issued. If an eject password is set, the BIOS, after determining the password, issues an inquiry to the OS as to whether the system environment setting can be changed. In the case where the setting change is possible, the PCI-DS bridge 18 is caused to separate the PCI bus 2 and the docking bus 7 by turning off the gate with the docking bus 7. At the same time, the DCPCLR# and the DOCKEN# are activated and inactivated respectively thereby to separate the DS-PCI/ISA bridge 31 and the docking bus 7 from each other. After that, a command (Eject Power ON) for ejection of the computer main body is issued to the power supply controller 24 while at the same time changing the setting of the system environment in collaboration with the OS.

The power supply controller 24 inactivates the DCPWON, so that the VDSPWR is turned off. The power supply controller 24 requests the BIOS to perform the ejection, and an eject request is sent to the DSC 33 from the BIOS. In accordance with the command from the DSC 33, the eject operation by the eject/lock mechanism 36 is started, so that the computer main body is ejected from the docking station. The DOCDT# thus becomes inactive.

The undocking sequence for removing the computer main body from the card dock 40 is such that only the signal (EJCTRQ) from the eject detection switch 403 is triggered. First, the bus is disconnected by turning off the gate, followed by switching off the card dock for performing the ejection in the same manner as for the docking station 30.

With the card dock 40, on the other hand, the computer main body is ejected by operating the handle 401. As a result, the bus may be disconnected immediately upon detection of the start of the eject operation by the detection switch 403. For this reason, an eject button is desirably provided on the OS for requesting the BIOS of an ejection in software fashion, so that an eject request is issued by the user selecting the particular button on the screen. This eject button can be used also for the docking station 30.

Now, explanation will be made about the operation for the case in which the computer system. according to the same embodiment transfers from power-off to power-on state, with reference to FIGS. 15 and 16.

When the computer system transfers from power-off to power-on state, the power supply controller 24 determines the cause of power-on of the system, and sets the decision result to a predetermined address in the register of the I/O control gate array 23. The causes of a power-on state of the computer system according to the same embodiment are described as follows:

(1) The power switch of the computer main body is turned on;
(2) The display panel of the computer main body is opened;
(3) Interruption of RTC;
(4) Interruption of the modem ring;
(5) The docking station is powered; and
(6) The eject switch of the docking station is turned on.

The power supply of the computer main body is powered on when the eject switch of the docking station is depressed by reason of the fact that a decision is made as to whether the removal of the computer main body from the docking station is to be permitted or not.

In the case where the power supply switch of the computer main body is depressed, the PSW# signal from the power supply switch 26 becomes low. In the case where the display panel of the computer main body is opened, on the other hand, the PNLOF# signal from the panel switch 27 becomes low. Also, in the case of an RTC interrupt, the RTCIRQ# signal from the RTC 22 becomes low. With a modem ring interrupt, on the other hand, the RI# signal from the modem 152 becomes low. The power supply controller 24 decides on the cause of power-off of the computer system by monitoring these signals.

In the case where the power supply switch of the docking station is depressed, the DSPSW# signal from the power supply switch 38 becomes low. In the case where the eject power supply signal of the docking station is depressed, on the other hand, the DSESW# signal from the eject switch 39 becomes low. The DS controller 33 monitors these signals, and notifies the power controller 24 of the cause of power-on start through the $I^2C$ bus 4. As a result, the power supply controller 24 decides on the cause of power-on start of the computer system.

The decision by the power supply controller 24 on the cause of power-on start and the result of the decision are set so that the cause of power-on start can be transmitted to the host application program including the BIOS 19. A process conforming to each cause of power-on start described above can thus be automatically executed.

Upon complete setting of the decision and the decision result of the cause of power-on start, the power supply controller 24 determines the docking condition of the system and the power condition of the docking station 30 or the card dock 40 connected.

The related operation procedure is shown in FIG. 16.

The power supply controller 24 first determines whether the DOCDT# signal is active or not by referring to the register of the I/O control gate array 23 (step S51). In the case where the DOCDT# signal is inactive, the power supply controller 24 determines that the docking connector is not connected (step S52), i.e., that neither the docking station 30 or the card dock 40 is connected, thereby terminating the process.

In the case where the DOCDT# signal is active, on the other hand, the power supply controller 24 determines whether or not the expansion unit (the docking station 30 or the card dock 40) is connected with an AC adapter (step S53). In the case where an AC adapter is not connected, the PCONF signal is determined as to whether it is active or not (step S54). The power supply line from the AC adapter is sent through the connector to the computer main body, where it is connected to the power supply line from the AC adapter of the computer main body. As a result, the connection or disconnection of the AD adapter is determined by the power supply controller 24 monitoring the voltage of the power supply line.

In the case where the PCONF signal is active, the power supply controller 24 decides that the card dock 40 is connected (step S55), thereby terminating the process. In the case where the PCONF signal is inactive, on the other hand, it is decided (1) that the docking station 30 is connected but a power supply fault has occurred in the docking station 30 (or the AC adapter is not connected) or (2) that a power supply fault has occurred in the card dock 40 connected (step S56), thus terminating this process. The connection of an AC adapter is essential for the operation of the docking station 30. Even in the case where an AC adapter is not connected with the card dock 40, however, the card dock 40 can be operated by the power supplied from a battery built in the computer main body. This difference arises from the difference in power consumption.

In the case where an AC adapter is connected, by contrast, the power supply controller 24 issues a command (Read DS Type command) for reading the status specific to a particular system and determines whether or not communication has been correctly performed (steps S57 and S58). Here, if impossible data is returned, the power supply controller 24 writes a predetermined error code in a preset register (step S59).

In the absence of two successive responses to this command (steps S60 and S61), the power supply controller 24 determines whether the PCONF signal is active or not (step S62). In the case where the PCONF signal is active, the power supply controller 24 decides that the card dock 40 is connected (step S63), thereby terminating the process. In the case where the PCONF signal is inactive, on the other hand, it is decided that the card dock 40 is connected but a power fault has occurred in the card dock 40 (step S64), thereby terminating the process.

In the case where an error response is returned to the Read DS Type command, it is determined that the docking station 30 is connected but some fault has occurred (steps S65). This fault is determined from the contents of the returned error response.

Also, in the case where a normal response is returned to the Read DS Type command, the power supply controller 24 determines whether the PCONF signal is active or not (step S66). In the case where the PCONF signal is active, it is decided that the docking station 30 is connected (step S67), thereby terminating the process. In the case where the PCONF is inactive, on the other hand, the power supply controller 24 decides that the docking station 30 is connected but a power fault has occurred in the docking station 30 (step S68), thereby terminating the process.

The power supply controller 24 sets the determine result to a predetermined address in the register of the I/O control gate array 23.

In this way, the type of the expansion unit connected can be determined. Therefore, the function of automatically setting an environment can be effectively utilized even in the case where the computer main body is used by being selectively connected to several types of expansion units.

It will thus be understood from the foregoing description that according to this invention, the security function of preventing the unauthorized removal of a portable computer from an expansion unit or the unauthorized use of an expansion unit is realized by utilizing a locking mechanism, and therefore a sufficient security is provided with respect to the mounting and dismounting of a portable computer on an expansion unit. Also, in view of the fact that the type of the expansion unit connected can be determined, it is possible to effectively use the function of automatically setting an environment even in the case where a portable computer is selectively used with a plurality of expansion units.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An expansion unit to which a computer is detachably connected for expanding fractions of the computer, the expansion unit comprising:

lock means for engaging said computer with said expansion unit and locking said computer in an engaging state;

eject means for unlocking said computer from the engaging state and ejecting said computer from said expansion unit in response to an eject command from an eject switch;

a locking mechanism having a key hole and a key removably inserted in said key hole, said locking mechanism adapted to be set at either a first position in which said lock means engages and locks said computer and said eject means unlocks and ejects said computer or at a second position in which said lock means locks said computer already engaged and does not engage a new computer and said eject means does not unlock and eject said computer;

an unlocking mechanism manually operable to unlock said computer; and wherein said locking mechanism further is adapted to be set at a third position in which said eject means unlocks and ejects said computer from said expansion unit in response to an operation of said unlocking mechanism.

2. An expansion unit according to claim 1, wherein said lock means comprises means for detecting mounting of said computer at a mounting position on said expansion unit, and engages said computer at said mounting position when the mounting of said computer at said mounting position is detected by said detecting means and said locking mechanism is set at said first position.

3. An expansion unit according to claim 1, wherein said eject means comprises means for detecting a locking fault of said lock means, and ejects said computer from a mounting position on said expansion unit when the locking fault of said lock means is detected by said detecting means.

4. An expansion unit according to claim 1, wherein said lock means comprises means for outputting a request command to said computer and locks said computer at a mounting position on said expansion unit when said lock means receives a predetermined reply command from said computer in response to the request command.

5. An expansion unit according to claim 1, wherein said computer includes a first bus for transmitting data and instructions and a first connector connected to said first bus, further comprising:

a second bus for transmitting data and instructions and a second connector connected to said second bus, and said lock means locking said computer at a mounting position on said expansion unit, with said first connector connected with said second connector.

6. The expansion unit according to claim 1, further comprising means for preventing said eject command from being issued when said locking mechanism is set at the second position.

7. An expansion unit to which a computer is detachably connected for expanding functions of said computer, the expansion unit comprising:
   lock meats for engaging said computer with said expansion unit and locking said computer in an engaging state;
   eject means for unlocking said computer from the engaging state and ejecting said computer from said expansion unit in response to an eject command from an eject switch;
   an unlocking mechanism which is manually operable to unlock said computer; and
   a locking mechanism having a key hole and a key removably inserted in said key hole, said locking mechanism adapted to be set at either a first position in which said lock means engages and locks said computer and said eject means unlocks and ejects said computer or at a second position in which said lock means locks said computer already engaged and does not engage a new computer and said eject means does not unlock and eject said computer;
   wherein said locking mechanism further is adapted to be set at a third position in which said lock means does not lock said computer already engaged and does not engage a new computer and said eject means unlocks and ejects said computer from said expansion unit in response to an operation of said unlocking mechanism.

8. An expansion unit according to claim 7, wherein said lock means comprises means for detecting mounting of said computer at a mounting position on said expansion unit, and engages said computer at said mounting position when the mounting of said computer at said mounting position is detected by said detecting means and said locking mechanism is set at said first position.

9. An expansion unit according to claim 7, wherein said eject means comprises means for detecting a locking fault of said lock means, and ejects said computer from a mounting position on said expansion unit when the locking fault of said lock means is detected by said detecting means.

10. An expansion unit according to claim 7, wherein said lock means comprises means for outputting a request command to said computer, and locks said computer at a mounting position on said expansion unit when said lock means receives a predetermined reply command from said computer in response to said request command.

11. An expansion unit according to claim 7, wherein said computer includes a first bus for transmitting data and instructions and a first connector connected to said first bus, further comprising:
   a second bus for transmitting data and instructions and a second connector connected to said second bus, and
   said lock means locks said computer at a mounting position on said expansion unit, with said first connector and said second connector connected to each other.

12. The expansion unit according to claim 7, further comprising means for preventing said eject command from being issued when said locking mechanism is set at the second position.

13. A portable computer selectively connectable to either a first expansion unit operable only when an AC adapter is connected to the first expansion unit or a second expansion unit operable even when an AC adapter is not connected to the second expansion unit, the computer comprising,
   a connector for connecting said computer to either said first expansion unit or said second expansion unit;
   means for detecting whether or not any expansion unit is connected to said computer, in accordance with a voltage of a predetermined pin of said connector;
   means for detecting whether or not an AC adapter is connected to either said first expansion unit or to said second expansion unit which is connected to said computer when said detecting means detects that and expansion unit is connected to said computer,
   first determining means for issuing a command for determining the type of said connected expansion unit, in response to detection of the connection of an AC adapter, and determining which expansion unit is connected to said computer in response to the response to said command; and
   second determining means for detecting whether or not a given power is supplied from a power supply provided in said expansion unit connected to said computer, in response to detection of the disconnection of an AC adapter, and for determining which expansion unit in connected to said computer in accordance with the result of the detection relating to whether or not the given power is supplied.

14. A portable computer according to claim 13, wherein said first determining means determines that said first expansion unit is connected to the computer and said first expansion unit is in a power supply fault in accordance with a response to said command.

15. A portable computer according to claim 13, further comprising:
   a power supply for generating a plurality of operating voltages in accordance with the voltage applied through said AC adapter and for supplying said plurality of operating voltages to said second expansion unit when said second determining means determines that said second expansion unit is connected to said computer.

16. An expansion unit adapted to be detachably connected to a computer to expand functions of the computer, the expansion unit comprising:
   means for locking a computer which is placed on a predetermined position of the expansion unit;
   means for ejecting the computer from the predetermined position of the expansion unit where an ejection command is issued;
   a key mechanism having a key hole and a key removably inserted in said key hole, said key mechanism adapted to be set at either a first position or a second position; and
   lock/eject control means for inhibiting an ejecting operation of said ejecting means if said locking means locks the computer on the predetermined position of the expansion unit when said key mechanism is set at the first position, and for inhibiting a locking operation of said locking means if said locking means does not lock the computer on the predetermined position of the expansion unit when said key mechanism is set at the second position;
   wherein said key mechanism is further adapted to be set at a third position and said lock/eject control means enables said ejecting means to operate in accordance with a manual operating member even if the ejection command is not issued when said key mechanism is set at the third position.

17. The expansion unit according to claim 16, in which said lock/eject control means allows operations of said locking means and said ejecting means when said key mechanism is set at the first position.

18. A portable computer connectable to either a first expansion unit which needs an AC adapter for operation or a second expansion unit which does not need an AC adapter for operation, the computer comprising, AC adapter detecting means for determining whether or not an AC adapter is connected to an expansion unit which is connected to the computer;

first determining means for issuing a command for determining the type of said expansion unit when said AC adapter detecting means determines that the AC adapter is connected to the expansion unit and determining which expansion unit is connected to said computer in response to a response to said command; and second determining means for detecting whether or not a given power is supplied from said expansion unit when said AC adapter detecting means determines that the AC adapter is not connected to the expansion unit and determining whether or not the second expansion unit is connected to said computer in response to a detection result of whether or not a given power is supplied from said expansion unit.

* * * * *